(12) United States Patent
Cannon et al.

(10) Patent No.: US 8,243,688 B1
(45) Date of Patent: Aug. 14, 2012

(54) METHODS AND SYSTEMS FOR CONFIGURING WIRELESS DEVICES

(75) Inventors: Joseph M. Cannon, Harleysville, PA (US); James A. Johanson, Macungie, PA (US); Philip D. Mooney, Sellersville, PA (US)

(73) Assignee: Alcatel Lucent, Paris (FR)

( * ) Notice: Subject to any disclaimer, the term of this patent is extended or adjusted under 35 U.S.C. 154(b) by 3219 days.

(21) Appl. No.: 09/594,586

(22) Filed: Jun. 15, 2000

(51) Int. Cl.
*H04Q 7/00* (2006.01)

(52) U.S. Cl. ........ 370/332; 370/352; 370/328; 370/338; 455/418; 455/419; 455/420; 455/67.11; 345/156; 345/163

(58) Field of Classification Search ........... 455/420, 455/575, 556.1, 557, 550, 418, 419, 566, 455/556.2, 20; 345/156–157, 163; 379/21; 341/176; 370/332, 352, 338, 328; 381/70; 361/679.03

See application file for complete search history.

(56) References Cited

U.S. PATENT DOCUMENTS

| | | | | |
|---|---|---|---|---|
| 5,491,740 A | * | 2/1996 | Ellis et al. ............ | 455/418 |
| 5,812,953 A | * | 9/1998 | Griffith et al. ......... | 455/558 |
| 5,864,757 A | * | 1/1999 | Parker .................. | 455/418 |
| 5,887,253 A | * | 3/1999 | O'Neil et al. .......... | 455/418 |
| 5,956,636 A | * | 9/1999 | Lipsit .................... | 455/411 |
| 5,966,671 A | * | 10/1999 | Mitchell et al. ........ | 455/550.1 |
| 5,970,418 A | * | 10/1999 | Budd et al. ............ | 455/566 |
| 5,974,311 A | * | 10/1999 | Lipsit .................... | 455/418 |
| 6,018,656 A | * | 1/2000 | Shirai ................... | 455/418 |
| 6,031,830 A | * | 2/2000 | Cowan .................. | 370/338 |
| 6,058,304 A | * | 5/2000 | Callaghan et al. ..... | 455/422.1 |
| 6,085,098 A | * | 7/2000 | Moon et al. ........... | 455/457 |
| 6,175,860 B1 | * | 1/2001 | Gaucher ................ | 709/208 |
| 6,177,905 B1 | * | 1/2001 | Welch .................. | 342/357.75 |
| 6,208,865 B1 | * | 3/2001 | Veerasamy ........... | 455/450 |
| 6,208,876 B1 | * | 3/2001 | Raussi et al. ......... | 455/557 |
| 6,223,028 B1 | * | 4/2001 | Chang et al. .......... | 455/419 |
| 6,233,448 B1 | * | 5/2001 | Alperovich et al. ... | 455/417 |
| 6,243,574 B1 | * | 6/2001 | McGregor et al. .... | 455/418 |
| 6,278,886 B1 | * | 8/2001 | Hwang ................. | 455/566 |
| 6,347,340 B1 | * | 2/2002 | Coelho et al. ......... | 709/246 |
| 6,356,543 B2 | * | 3/2002 | Hall et al. ............. | 370/352 |
| 6,377,815 B1 | * | 4/2002 | Krishnan et al. ...... | 455/553.1 |
| 6,487,396 B1 | * | 11/2002 | Sassi .................... | 455/90.1 |
| 6,529,727 B1 | * | 3/2003 | Findikli et al. ........ | 455/411 |
| 6,549,768 B1 | * | 4/2003 | Fraccaroli ............. | 455/456.3 |
| 6,594,484 B1 | * | 7/2003 | Hitchings, Jr. ........ | 455/414.1 |
| 6,608,832 B2 | * | 8/2003 | Forslow ................ | 370/353 |
| 6,647,260 B2 | * | 11/2003 | Dusse et al. .......... | 455/419 |
| 6,650,893 B1 | * | 11/2003 | Lipsit ................... | 455/419 |
| 6,678,613 B2 | * | 1/2004 | Andrews et al. ....... | 701/213 |
| 6,728,531 B1 | * | 4/2004 | Lee et al. .............. | 455/419 |
| 6,748,209 B2 | * | 6/2004 | Lipsit ................... | 455/411 |
| 6,993,575 B2 | * | 1/2006 | Abkowitz et al. ..... | 709/220 |
| 7,088,990 B1 | * | 8/2006 | Isomursu et al. ...... | 455/412.1 |
| 7,237,261 B1 | * | 6/2007 | Huber et al. .......... | 726/12 |
| 7,266,371 B1 | * | 9/2007 | Amin et al. ........... | 455/419 |

* cited by examiner

*Primary Examiner* — Marceau Milord
(74) *Attorney, Agent, or Firm* — Capitol Patent & Trademark Law Firm, PLLC

(57) ABSTRACT

The features and settings of wireless devices, such as cellular and cordless telephones, can be configured through the use of a user friendly web page, website, e-mail menu or the like. After a user has identified a wireless device or devices to configure, she then selects the features and settings she desires. The selected settings are then transmitted to the identified wireless device or devices. In this manner, wireless devices can be remotely configured and there is no need to repeat identical steps to configure multiple devices with the same configuration.

30 Claims, 1 Drawing Sheet

METHODS AND SYSTEMS FOR CONFIGURING WIRELESS DEVICES

BACKGROUND OF THE INVENTION

Wireless devices, such as cellular and cordless telephones, have been around for a number of years. In an attempt to capture more and more customers, manufacturers of wireless devices have incorporated more and more features into their devices. Today, many wireless devices allow users to customize the features of a given device to suit their own, unique needs.

As the number of features has increased, so has the degree of difficulty in learning to use all or some of the features. Typically, a manufacturer will provide an instruction booklet to aid the user in programming or otherwise learning about the features of a wireless device. In addition to an instruction booklet, often times a manufacturer will design its device so that the features can be accessed via a built-in set-up or menu screen which is a part of the device.

These solutions to the problem of educating a user about the workings of her device are sufficient provided the user has access to the instruction booklet or provided the set-up menu is easy to use. Even when these conditions are met, it is tedious to require a user to repeat the same steps in order to program a second wireless device with the same features.

Accordingly, it is desirable to provide for methods and devices for configuring a wireless device without having to use an instruction booklet or a built-in set-up menu either remotely or via a user friendly set-up menu.

It is also desirable to provide for methods and devices for configuring more than one wireless device without the need to repeat previously completed steps.

Other objectives, features and advantages of the present invention will become apparent to those skilled in the art from the following description taken in conjunction with the accompanying drawings.

SUMMARY OF THE INVENTION

In accordance with the present invention there are provided methods and systems for configuring a wireless device without the need to refer to an instruction manual or set-up menu and which are capable of configuring more than one wireless device without repeating the same steps over and over again.

These methods comprise displaying wireless device settings within a web site, web page, e-mail menu or the like which can be remotely located from a wireless device.

Once the settings are displayed, a user can select or adjust the settings. The selected/adjusted settings represent a configuration which can be transmitted to a wireless service provider or network which then transmits the configuration to a wireless device identified by the user.

In the same manner, the configuration may be sent to any number of wireless devices identified by the user. Examples of some wireless devices are cellular and cordless telephones.

Alternatively, the configuration may be transmitted directly to the wireless device without going through a wireless service provider. This becomes useful when a user wishes to configure more than one wireless device and has physical access to each device she desires to configure.

The present invention and its advantages can be best understood with reference to the drawings, detailed description of the preferred embodiments and claims that follow.

DETAILED DESCRIPTION OF THE INVENTION

Figure 1:
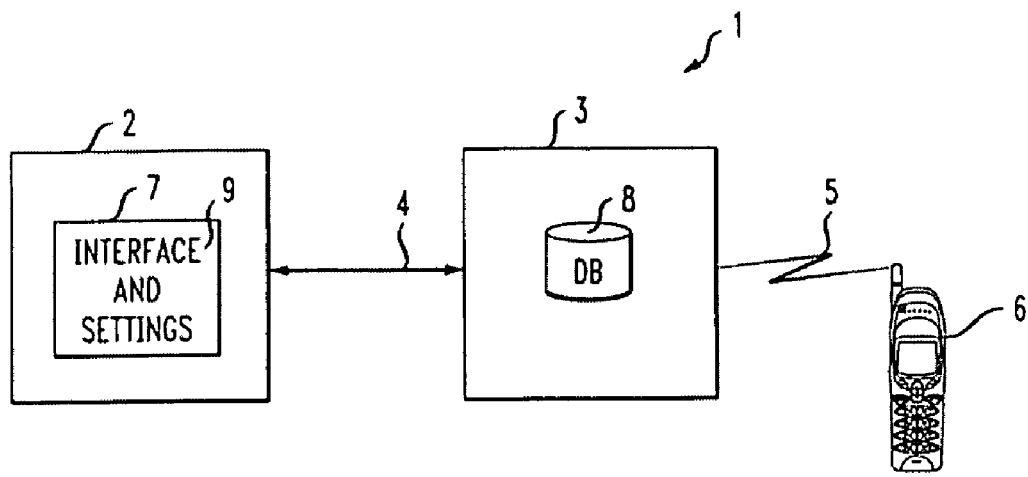
FIG. 1 shows a simplified overview of a system and method for configuring a wireless device according to one embodiment of the present invention.

Referring to FIG. 1, there is shown an example of a system 1 which can be used to configure a wireless device 6 according to one embodiment of the present invention. More specifically, the system 1 comprises configuration interface or means 2, wireless service provider or network 3 and wireless device 6. As envisioned by the example shown in FIG. 1, a user of wireless device 6 can configure this device 6 via the components shown in FIG. 1 as follows.

To begin with, a user accesses the configuration interface 2 in order to adjust or otherwise select the features and settings of device 6. It should be understood that the interface 2 may comprise any number of devices, such as a display of some sort, a keyboard or keypad, and even an audio interface. In addition, it should be understood that the display, keyboard/keypad or audio interface may be a part of a larger device such as a computer, a wireless device (e.g., cellular or cordless telephone) or personal digital assistant ("PDA") to give just a few examples. In the example which follows it will be assumed that the interface 2 comprises some sort of computer and display.

More specifically, in an illustrative embodiment of the present invention, the interface 2 is adapted to display wireless device features and/or settings 9 within a web site or web page 7. This web site or page 7 may comprise the web site of the manufacturer of wireless device 6 or another entity responsible for helping the user configure her wireless device 6, e.g., a provider of wireless service.

Interface 2 is adapted to display the features and settings 9 of wireless device 6 which may be selected or adjusted by the user. In an illustrative embodiment of the invention, to enable the system 1 to transmit selections or adjustments made by a user to the wireless device 6, the user must first enter at least a telephone or communication number into interface 2 which identifies wireless device 6. Interface 2 is adapted to receive the number input by the user and to send or otherwise transmit substantially the same number to wireless service provider 3. Optionally, the user may enter other information and the interface 2 may be adapted to receive other information, such as an account number, password or other identification information, for example.

Upon receiving the number and/or other information from interface 2, provider 3 is adapted to select a database 8 which comprises the features and settings which correspond to the wireless device identified by the communications number. Provider 3 may also be adapted to establish a connection between interface 2 and the wireless device.

After the user has input a telephone number or another number identifying device 6, she may then select or adjust the features/settings (collectively referred to below as "settings" or "configuration") as desired. As before, interface 2 is adapted to receive these settings and to transmit substantially the same settings to provider 3. Upon receiving the settings, provider 3 is adapted to select or adjust the settings for device 6 which are stored in database 8. Thereafter, provider 3 is adapted to transmit substantially the same settings to wireless device 6 to insure that device 6 will function as the user desires.

Though FIG. 1 shows the interface 2 and provider 3 as two separate units, it should be understood that these units may be combined into one or further broken down into additional units.

In an illustrative embodiment of the invention, the provider 3 is adapted to transmit the settings to the wireless device 6 via a datalink or means 5. This datalink may be a wireless link or may comprise a hard-wired link. In an illustrative embodiment of the invention, the datalink 5 comprises a radio frequency, wireless link or the like. Though only one wireless device 6 is shown, it should be understood that the same configuration can be transmitted to any number of devices identified by the user.

In sum, the system 1 allows a user to select or adjust settings of her wireless device 6 without the need to refer to an instruction manual or use a cumbersome set-up menu incorporated within the device 6.

Though it has been assumed in the discussion just finished that device 6 is not physically close to interface 2, the invention is not so limited. Device 6 may alternatively comprise a cellular or cordless telephone located near or far from interface 2 or provider 3. Path 5 may alternatively comprise a hardwired or wireless pathway depending on the needs of device 6.

Figure 2:
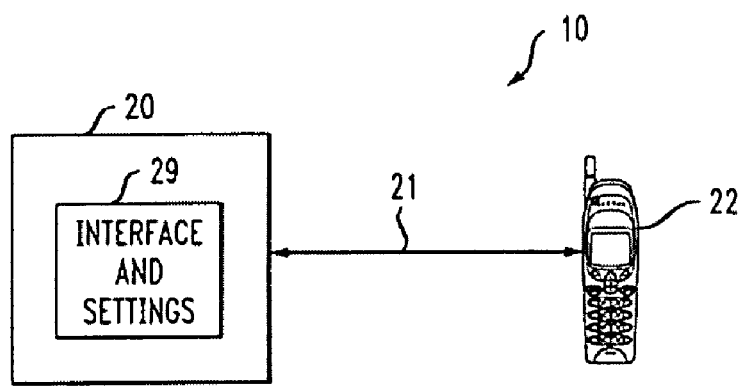
FIG. 2 likewise depicts a simplified overview of a system and method for configuring a wireless device according to another embodiment of the present invention.

Some further comments before moving on to another embodiment of the invention shown in FIG. 2 seem appropriate at this time. First, though it is shown as being a part of the provider 3, the database 8 may alternatively be a part of interface 2, wireless device 6 or another device. Second, though the discussion above used as its example a web page or web site 7, it should be understood that any kind of network based menu may be used, such as an e-mail menu, PDA menu, intranet menu or an extranet menu to name just a few additional examples. In yet another embodiment, interface 2 can be adapted to display a wireless device (e.g., cellular telephone) menu. Between provider 3 and interface 2 is path 4. This path may comprise a wired link, wireless link or some combination of the two which links the provider 3 and interface 2 together, such as a link capable of sending the settings as an e-mail to device 6.

As mentioned above, FIG. 2 depicts another illustrative embodiment of the invention. More particularly, FIG. 2 shows a system 10 which comprises configuration interface 20 and wireless device 22 linked via a datalink 21. Unlike the embodiment shown in FIG. 1, there is no wireless service provider in this embodiment. Instead, once a user selects or otherwise adjusts the features 29 she desires these can be sent directly to the wireless device 22. In an illustrative embodiment of the invention, the interface 20 comprises a keypad of a "master" wireless device, such as a cellular telephone while the wireless device 22 comprises a "slave". These devices are so named because the interface 20 is used to select or adjust the settings of the device 22. This second embodiment illustrates the fact that, for example, the present invention envisions embodiments where one wireless device can be used to adjust the features of a second wireless device. Though only one slave, wireless device is shown in FIG. 2, it should be understood that the invention is not so limited. Rather, any number of slave devices can be connected to the master device or interface 20.

Stepping back a little, once the interface 20 receives the settings from a user, it is adapted to store these settings. Once stored, the interface may be further adapted to transmit substantially the identical settings to slave wireless device 22. Typically, path 21 will comprise a hard-wired path though a wireless path may be utilized as well. In an alternative embodiment of the invention, the interface 20 may be adapted to carry out substantially all of the functions of the wireless service provider 3 shown in FIG. 1, the difference being that the provider 3 is typically a part of a network of some sort while the interface 20 need not be part of a network.

Up until now, both examples given above have assumed that a user accesses either interface 2 or 20 in order to input a new configuration for a wireless device. This need not be the case. In yet another embodiment of the invention, a user may direct that a previously stored or existing configuration be transmitted to wireless devices 6 or 22. Likewise, interfaces 2 and 20 may be adapted to transmit previously stored or existing configurations to devices 6 or 22. The ability to use existing or stored configurations solves one of the problems discussed initially; having to repeat identical steps in order to program or otherwise configure the operation of a second device. Instead of repeating steps, all a user need do is to instruct the interface 2 or 20 to transmit the identical configuration to a second wireless device 6 or 22. Similarly, this feature allows a user to reuse configurations she has previously used before and now wishes to reuse for one reason or another. Collectively, an existing or previously stored configuration can be referred to as an "existing" configuration.

In both embodiments, the user is not required to refer to a reference manual. In the embodiment shown in FIG. 1, the user need not even use a keypad of her wireless device to control its settings. In the embodiment shown in FIG. 2, if a user has more than one wireless device her second (or more) wireless device 22 may be configured by her first or master device 20. When the wireless device 22 comprises a cellular telephone, a user can send the existing settings for her first cellular telephone 20 to her second one 22. In an alternative embodiment of the invention, the interface and wireless devices may utilize Bluetooth™ based methods and devices to exchange information, such as a user's selected settings.

It is expected that the configuration selected by a user will typically be transmitted to her wireless device soon thereafter. In an alternative embodiment of the invention, however, the provider 3 or interface 20 may be adapted to transmit the configuration/settings to a wireless device after a predetermined time. In other words, the provider 3 or interface 20 may be adapted to transmit the configuration/settings according to a schedule or the like. For example, suppose a user knows that she will be attending a meeting from 9:30 a.m. to 11:30 a.m. During this time she does not want her wireless device 6 to ring because the ringing might disrupt the meeting. So, the user accesses interface 2 (or 20), selects a ringing setting 9 and adjusts it so that it will turn off sometime at or before 9:30 a.m. If desired, the user can also adjust the ringing setting so that the wireless 6 begins to ring again on or after 11:30 a.m.

This is just one example of a scheduled transmission or selected settings. In other embodiments the schedule may comprise daily, weekly, monthly or periodic transmission of selected settings.

Both embodiments allow a user to "remotely" configure her wireless device using a user friendly interface. That is, the embodiments shown in FIGS. 1 and 2 allow a user to easily configure wireless devices 6 or 22, respectively, without ever holding devices 6 or 22. Sometimes the invention allows a user to configure a wireless device from a truly remote location, as is the case in the embodiment shown in FIG. 1. Other times, the invention allows a user to configure her wireless device by connecting it to a master interface or device which may be located remotely or locally.

Sometimes wireless devices fail to correctly receive information sent to them. Realizing this, the present invention envisions embodiments which take this into account. For example, in one embodiment of the invention the provider 3 or interface 20 is adapted to repeatedly transmit substantially the same configuration until the wireless device 6 or 22 receives a correct transmission.

Though the above description focuses on devices, it should be understood that the present invention also envisions methods for carrying out the features and functions of the present invention.

It is to be understood that changes and variations may be made without departing from the spirit and scope of this invention as defined by the claims that follow.

We claim:

1. A method for configuring a wireless device comprising:
   accessing a web page via an Internet Protocol (IP)-based network using a first wireless device;
   displaying settings of a separate wireless device within the web page accessed by the first wireless device; and
   transmitting selected settings to a wireless service provider via the IP-based network.

2. The method as in claim 1 further comprising transmitting the substantially same settings to the separate wireless device.

3. The method as in claim 2 wherein the separate wireless device comprises a cellular telephone.

4. The method as in claim 2 wherein the separate wireless device comprises a cordless telephone.

5. The method as in claim 2 wherein transmitting comprises transmitting the selected settings according to a schedule.

6. The method as in claim 2 wherein transmitting comprises repeatedly transmitting the selected settings until the separate wireless device receives the transmission.

7. The method as in claim 2 wherein the selected settings are transmitted to a separate wireless device identified by a wireless device communications number.

8. The method as in claim 7 wherein the communications number comprises a telephone number.

9. The method as in claim 1 wherein displaying comprises displaying the settings within an e-mail menu.

10. The method as in claim 1 wherein displaying comprises displaying the settings within a PDA menu.

11. The method as in claim 1 wherein displaying comprises displaying the settings within a wireless device menu.

12. The method as in claim 1 wherein the selected settings comprise an existing configuration.

13. The method as in claim 1 wherein the selected settings comprise a new configuration.

14. The method as in claim 1 wherein the selected settings comprise cellular telephone settings.

15. The method as in claim 1 wherein the selected settings comprise cordless telephone settings.

16. A system for configuring a wireless device comprising:
   a configuration interface adapted to access a web page via an Internet Protocol (IP)-based network using a first wireless device, display settings of a separate wireless device within the web page accessed by the first wireless device, and to transmit selected settings to a wireless service provider.

17. The system as in claim 16 further comprising a wireless service provider adapted to transmit substantially the same selected settings to the separate wireless device.

18. The system as in claim 17 wherein the separate wireless device comprises a cellular telephone.

19. The system as in claim 17 wherein the separate wireless device comprises a cordless telephone.

20. The system as in claim 17 wherein the provider is adapted to transmit the selected settings according to a schedule.

21. The system as in claim 17 wherein the provider is adapted to repeatedly transmit the selected settings until the separate wireless device receives the transmission.

22. The system as in claim 17 wherein the provider is adapted to transmit the selected settings to the separate wireless device upon receiving a wireless device communications number which identifies the wireless device.

23. The system as in claim 22 wherein the communications number comprises a telephone number.

24. The system as in claim 16 wherein the interface is adapted to display the settings within an e-mail menu.

25. The system as in claim 16 wherein the interface is adapted to display the settings within a PDA menu.

26. The system as in claim 16 wherein the interface is adapted to display the settings within a wireless device menu.

27. The system as in claim 16 wherein the selected settings comprise an existing configuration.

28. The system as in claim 16 wherein the selected settings comprise a new configuration.

29. The system as in claim 16 wherein the selected settings comprise cellular telephone settings.

30. The system as in claim 16 wherein the selected settings comprise cordless telephone settings.

* * * * *